United States Patent
Ratner

(10) Patent No.: US 8,613,273 B2
(45) Date of Patent: Dec. 24, 2013

(54) FUEL CONDITIONING MODULES AND METHODS

(75) Inventor: Joel S. Ratner, West Palm Beach, FL (US)

(73) Assignee: Royce Walker & Co., Ltd, West Palm Beach, FL (US)

( * ) Notice: Subject to any disclaimer, the term of this patent is extended or adjusted under 35 U.S.C. 154(b) by 99 days.

(21) Appl. No.: 13/156,093

(22) Filed: Jun. 8, 2011

(65) Prior Publication Data

US 2012/0312266 A1 Dec. 13, 2012

(51) Int. Cl.
F02M 27/00 (2006.01)

(52) U.S. Cl.
USPC .............................. 123/538; 123/536; 123/537

(58) Field of Classification Search
USPC .......................................... 123/538, 536, 537
See application file for complete search history.

(56) References Cited

U.S. PATENT DOCUMENTS

| | | | |
|---|---|---|---|
| 4,335,698 A | 6/1982 | Stephens | |
| 4,884,531 A * | 12/1989 | Degnan et al. | 123/3 |
| 5,871,000 A | 2/1999 | Ratner | |
| 6,276,346 B1 | 8/2001 | Ratner et al. | |
| 6,555,080 B1 | 4/2003 | Elomari | |
| 6,685,897 B1 | 2/2004 | Penetrante et al. | |
| 6,915,789 B2 * | 7/2005 | Ratner et al. | 123/538 |
| 7,090,811 B2 | 8/2006 | Cho et al. | |
| 7,156,081 B2 * | 1/2007 | Ratner et al. | 123/538 |
| 7,527,024 B2 * | 5/2009 | Hosoda et al. | 123/3 |
| 2005/0053531 A1 * | 3/2005 | Sakurai et al. | 422/190 |
| 2005/0145225 A1 * | 7/2005 | Ratner et al. | 123/538 |
| 2006/0180099 A1 | 8/2006 | Aimoto et al. | |
| 2007/0209643 A1 * | 9/2007 | Lu | 123/538 |
| 2008/0230017 A1 * | 9/2008 | Kobayashi | 123/3 |
| 2009/0035512 A1 * | 2/2009 | Masukawa et al. | 428/116 |
| 2010/0119769 A1 * | 5/2010 | Watanabe et al. | 428/116 |
| 2010/0276279 A1 | 11/2010 | Arnett et al. | |

FOREIGN PATENT DOCUMENTS

| | | |
|---|---|---|
| JP | 2001-221109 | 8/2001 |
| KR | 10-0892170 | 4/2009 |

OTHER PUBLICATIONS

International Search Report and Written Opinion dated Oct. 8, 2012.

* cited by examiner

*Primary Examiner* — Marguerite McMahon
*Assistant Examiner* — James Kim
(74) *Attorney, Agent, or Firm* — Nixon & Vanderhye P.C.

(57) ABSTRACT

Fuel conditioning modules that condition a combustible fuel prior to combustion are provided so that fuel to be conditioned is brought into contact with a fuel conditioning insert assembly which includes a zeolite catalyst material comprised of a mixture of zeolite particulates and rare earth metal or metal oxide particulates in a solid resin binder disposed in a housing flow through passageway such that the fuel flowing in the passageway between inlet and outlet ends of the housing contacts the fuel conditioning insert assembly. The catalytic metal is most preferably at least one selected from the group consisting of copper, aluminum, stainless steel, titanium, magnesium, chromium, barium, calcium, platinum, palladium, nickel, bronze and iron. The zeolite catalyst material may be dispersed in the form of solid chips throughout a mass of metallic elements form of a catalytic metal.

20 Claims, 3 Drawing Sheets

FUEL CONDITIONING MODULES AND METHODS

FIELD

The disclosed embodiments herein relate to fuel conditioning modules and methods for use in an internal combustion engine and oil and gas fired furnaces (e.g., boilers). In especially preferred embodiments, fuel conditioning modules and methods are provided which are substantially easy to install and maintenance free, and structured to provide a more complete combustion of fuel, thereby substantially reducing the emission of pollutants, a cleaner running engine and furnace (thereby requiring less engine and furnace maintenance), and causing significantly increased fuel efficiency for the engine and furnace to be realized.

BACKGROUND

The natural inefficiency inherent in internal combustion engines and furnaces is well documented. Specifically, internal combustion engines and furnaces utilizing fossil fuels typically emit unburned or under-burned fuel from the exhaust as well as the undesirable byproducts of combustion. This under-burning of fuel causes severe environmental problems as the resultant pollutants, some of which are thought to be cancer causing, are emitted directly into the atmosphere settling on the ground and seeping into the water tables.

In addition to being emitted directly into the atmosphere through the exhaust, many by-products of fuel combustion simply accumulate on internal engine components, with often 30% of the exhaust being directed into the engine. This causes those engine components to wear out sooner and require frequent maintenance and repairs which can lead to shortened total engine life. Furthermore, the incomplete combustion of fuel within an engine substantially under-utilizes the energy capacity of the fuel. Specifically, in addition to the environmental concerns due to pollution attributed to the under-utilization of the energy capacity of fuel, there are also resultant losses in economic efficiency due to higher fuel and maintenance expenses as well as a generally shorter engine life.

Therefore, a real need exists to improve fuel combustion efficiencies. It is towards fulfilling such need that the present invention is directed.

SUMMARY OF EXEMPLARY EMBODIMENTS

The present invention provides fuel conditioning modules to condition a combustible fuel prior to combustion. According to preferred embodiments, the fuel conditioning modules include a housing having inlet and outlet ends and defining a flow through passageway for the fuel therebetween. A fuel conditioning insert assembly is disposed in the flow through passageway defined by the housing such that the fuel flowing in the passageway between the inlet and outlet ends of the housing contacts the fuel conditioning assembly.

The fuel conditioning insert assembly will most preferably include a zeolite catalyst material comprised of a mixture of zeolite particulates and rare earth metal or metal oxide particulates in a solid resin (preferably epoxy) binder. The zeolite catalyst material may also be provided as a layer formed on an interior surface of the housing upstream of the conditioning insert assembly. Preferred zeolite particulates for use in the zeolite catalyst material may include a micro porous aluminosilicate minerals, with at least one zeolite material selected from the group consisting of anaicime, chabazite, clinoptilolite, heulandite, natrolite, phillipsite and stilbite being especially preferred. The rare earth metal or metal oxide particulates in the zeolite catalyst material will preferably include at least one metal and/or metal oxide of the lanthanide series of elements of the Periodic Table, especially at least one metal and/or metal oxide selected from the group consisting of dysprosium, holmium, lanthanum, cerium, samarium, bastnaesite, and gadolinite.

Optionally, the zeolite catalyst material may include at least some of the metallic elements formed of a catalytic metal. In preferred embodiments, the catalytic metal will be at least one selected from the group consisting of copper, aluminum, stainless steel, titanium, magnesium, chromium, barium, calcium, platinum, palladium, nickel, bronze and iron.

In certain preferred embodiments, the fuel conditioning modules will be provided with a conditioning insert member having a mass of metallic elements formed of a catalytic metal (e.g., at least one of copper, aluminum, stainless steel, titanium, magnesium, chromium, barium, calcium, platinum, palladium, nickel, bronze and iron). Preferably, solid particles or substantially flat chips of the zeolite catalyst material may be dispersed throughout the mass of metallic elements of the conditioning insert member.

According to other embodiments, the fuel conditioning modules may include inlet and outlet screen assemblies positioned at the inlet and outlet ends of the housing. At least one or each of the screen assemblies may be formed of a catalytic metal.

One preferred method for conditioning fuel prior to combustion includes bringing unconditioned fuel into contact with a fuel conditioning insert assembly having a catalyst region which is comprised of the zeolite catalyst material to thereby obtain a conditioned fuel, and thereafter combusting the conditioned fuel. Preferably the fuel that is conditioned includes a liquid or gas fuel for an internal combustion engine or furnace, e.g., diesel fuel, natural gas or gasoline.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
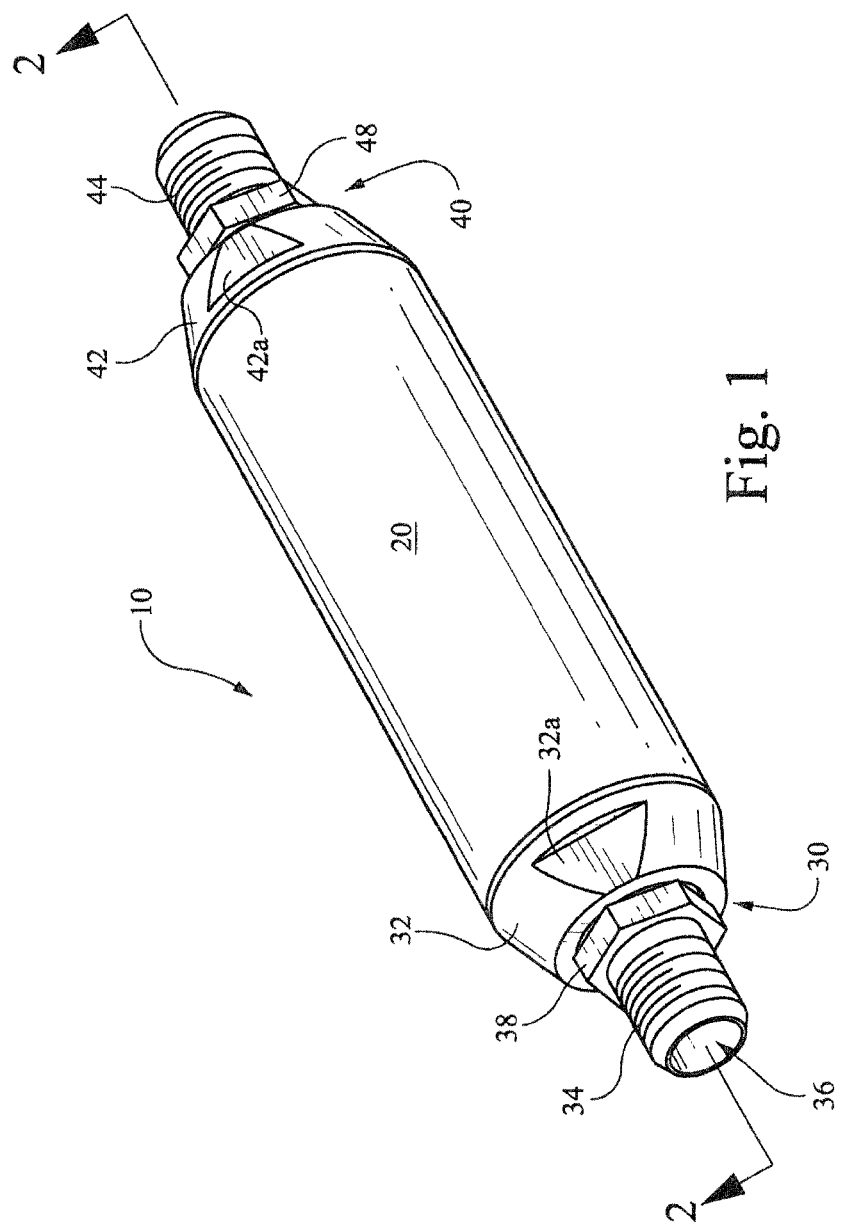
FIG. 1 depicts a perspective view of a fuel conditioning module in accordance with an embodiment of the present invention.
Figure 2:
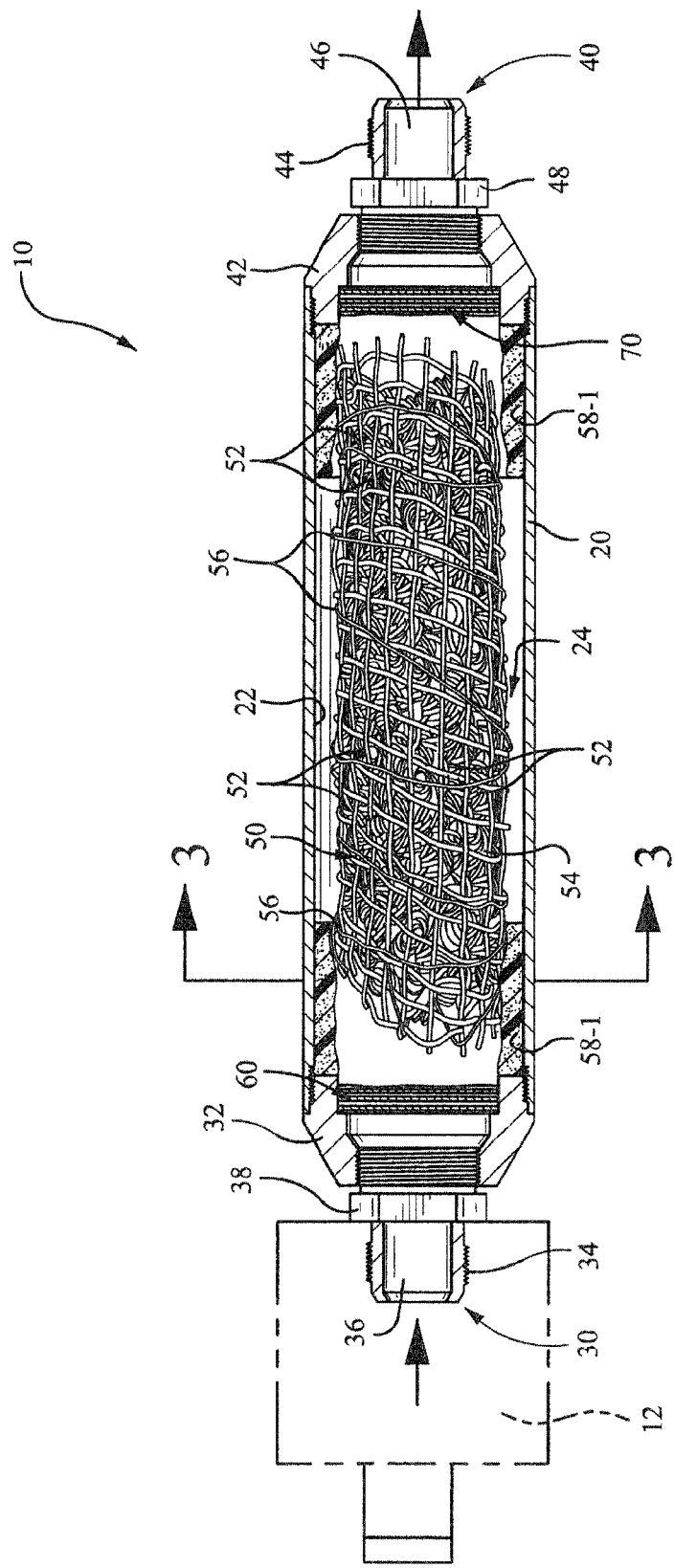
FIG. 2 is a longitudinal cross-section through the fuel conditioning module depicted in FIG. 1 as taken along lines 2-2 therein.
Figure 3:
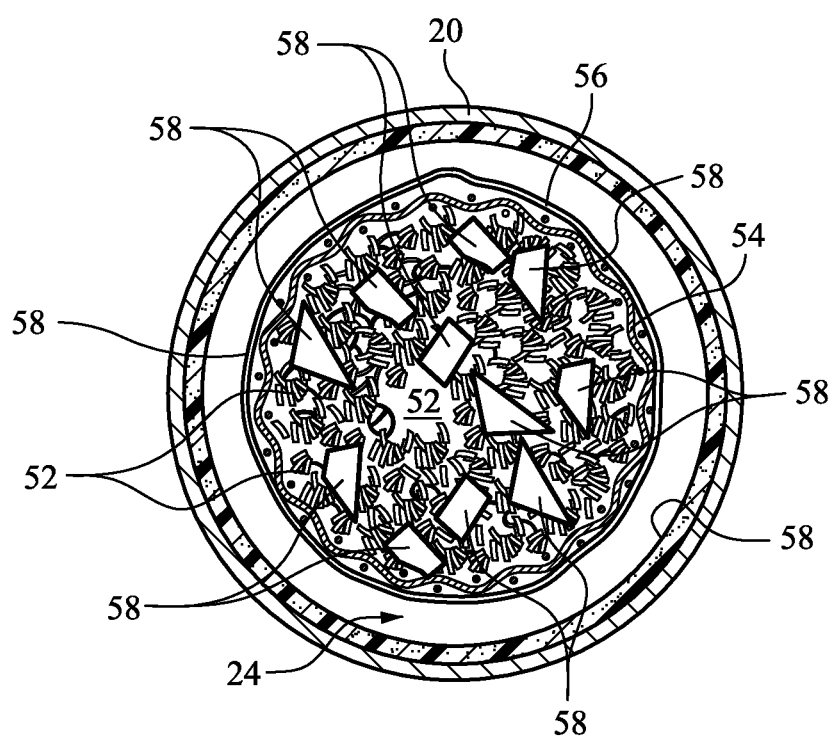
FIG. 3 is a latitudinal cross-section of the fuel conditioning module as taken along lines 3-3 in FIG. 2.

Accompanying FIGS. 1-3 depict an exemplary embodiment of a fuel conditioning module 10 according to the invention which is structured to be connected in line with an engine's fuel system (e.g., downstream of a fuel filter 12, see FIG. 2). The fuel conditioning module 10 thus effectively treats and conditions the fuel prior to its combustion within the engine (not shown), thereby ensuring that a more effective, more efficient fuel burn is achieved. Most preferably, liquid combustible fuel, such as natural gas, diesel fuel or gasoline supplied to a gasoline or diesel fuel-combustion engine or a furnace, is conditioned by the module 10.

The fuel conditioning module 10 preferably includes a generally tubular rigid housing 20 having inlet and outlet end connections 30, 40, respectively. The housing 20 defines an interior surface 22, which establishes an interior flow through passage 24 for the fuel (see FIG. 2). The housing 20 may be provided by separate tubular elements sleeved over one another or may be provided as a single unitary element formed of the desired material to contact the fuel during use. If provided by separate sleeved elements, the interior surface 22 of the housing 20 will thus be formed of the desired material to contact the fuel.

The inlet and outlet end connections 30 and 40 most preferably include end caps 32, 42, respectively, which are threadably engaged with a respective inlet and outlet end of the tubular housing 20. The end caps 32, 42 are provided with machined recesses, 32a, 42a to accept a turning tool (e.g., wrench) to allow for assembly and disassembly relative to the housing 20 as may be needed. Inlet and outlet nipples 34, 44 are threadably coupled to each of the end caps 32, 42 and define inlet and outlet flow passages 36, 46, respectively, which fluid-communicate with the flow through passageway 24 of the housing 20. The nipples 32, 42 may be positionally locked with respect to the end caps 32, 42 by means of lock nuts 38, 48, respectively.

The nipples 34, 44 are most preferably threadably and removably connected in-line with the engines fuel line (not shown). Such interconnection with the fuel line will thus allow the module 10 to be removed therefrom for refurbishment and/or replacement as may be needed. Thus, the inlet nipple 34 is preferably connected to the engine's fuel line downstream of the fuel system via threaded connection thereto. As such, the inlet nipple 34 receives filtered fuel through the inlet passage 36 which then directs the fuel to flow into the passageway 24 of the housing 20 where it is conditioned as will be described in greater detail below. The conditioned fuel will thus be discharged from the outlet passage 46 of the outlet nipple 44 and pass on to the engine where it is combusted. In such a manner, therefore, fuel is able to pass through the housing 20 where it can be effectively conditioned in advance of combustion.

In preferred embodiments, the housing 20 is formed entirely of copper, for reasons to be described subsequently. However, other, preferably rigid, materials including metal and/or plastic materials may also be utilized effectively. Furthermore, the housing 20 preferably includes a generally elongate tubular configuration as shown in FIGS. 1 and 2 so as to facilitate a desired residence time in which the fuel is within the flow through passage 24 of the housing 20 and is being conditioned. Of course, the length of the housing 20 may be altered to suit particular situations in which more or less conditioning is desired, and also so as to accommodate for the capacity and size requirements of specific engine types. For example, by increasing the length of the housing 20, and therefore the flow through passage 25, the average residence time of a given quantity of fuel is increased and the fuel conditioning reaction which takes place is maximized.

The fuel conditioning module 10 will necessarily include a conditioning insert assembly 50 disposed within the flow passageway 24 of the housing 20. The fuel flowing through the passageway 24 is thus brought into physical contact with the conditioning insert assembly 50. The conditioning insert assembly 50 is thus structured to at least temporarily chemically condition the fuel flowing through the flow through passageway 24. In particular, the conditioning insert assembly 50 is structured and disposed so as to rearrange the molecular bonds of the fuel with a catalytic effect, and separate the fuel particles into a plurality of subatomic particles. As a result of this conditioning of the fuel, the density of the fuel is reduced and the burning efficiency of the fuel is substantially increased. More particularly, as the fuel is treated by the conditioning insert assembly 50 during its flow through the passageway 24 of the housing 20 the lesser density, more dispersed fuel is able to more completely burn as a majority of the fuel molecules are subjected to the combustion reaction and can add to the energy provided before being eliminated as exhaust. This reaction has the two-fold effect of increasing the energy that results from the burn, thereby increasing the fuel efficiency, and reducing the harmful particulates that are present in the exhaust emissions, thereby keeping the engine or furnace cleaner and in operating condition longer and reducing the environmental pollutants present in the exhaust fumes.

The conditioning insert assembly 50 most preferably includes a turbulence assembly, which is structured to create a turbulent flow of the fuel within the flow through passage 24. The turbulence assembly is structured to substantially agitate the fuel flowing through the flow through passage 24 and thereby substantially enhance the effects of the conditioning by ensuring that the fuel particulate are substantially dispersed and are fully influenced by the conditioning elements present within the flow through passageway 24 and responsible for the conditioning to be achieved.

As is perhaps best shown in FIGS. 2 and 3, one preferred embodiment of the fuel conditioning insert assembly 50 includes a mass of conditioning metallic elements 52 contained within a wire mesh enclosure 54 disposed within the flow through passageway 24 and structured to create turbulence in the fuel as it flows therethrough from the inlet end 30 to the outlet end 40 of the housing 20. In preferred forms, the metallic elements 52 are generally narrow coiled metallic ribbons of extreme or indefinite length that are randomly entangled with one another. Specifically, the entangled, random and dense configuration of the mass of metallic elements 52 achieves a maximum turbulent effect as the fuel is pushed therethrough and is continuously rerouted.

The metallic elements 52 may be formed of any metal which imparts a catalytic effect to the fuel in the manner described. Preferably, the metallic elements 52 may be selected from one or more catalytic metals, that is metals which impart a catalytic effect to the fuel. By the term "catalytic metal" is meant to refer to at least one of copper, aluminum, stainless steel, titanium, magnesium, chromium, barium, calcium, platinum, palladium, nickel, bronze and iron. In the preferred embodiment depicted, the mass of metallic elements 52 are formed of stainless steel.

The wire mesh enclosure 54 is most preferably structured in a generally net-like configuration so that it effectively retains the mass of metallic elements 52 therein and provides a substantially large surface area for contacting the fuel as it flows through the passageway 24. The mesh enclosure 54 is thus oriented inside the housing 20 so as to permit the fuel to flow freely therethrough, and through the mass of metallic elements 52 contained therewithin, without allowing any of the metallic elements 52 to exit the housing 20 with the conditioned fuel. The mesh enclosure 54 may be constructed of wires formed of a catalytic metal as noted above. In the preferred embodiment depicted, the mesh enclosure 54 is formed of aluminum wires.

In the illustrated embodiment, a plurality of wire loops 56 or like fasteners may disposed with the mesh enclosure 54, so as to facilitate conditioning and turbulence of the fuel as well as assist in positionally maintaining the mesh enclosure 54 around the metallic elements 52. These wire loops may likewise be formed of a catalytic metal as mentioned previously. Preferably, the wire loops are formed of copper wires.

As is shown in FIG. 3, the conditioning insert assembly 50 will also importantly include a zeolite catalyst material 58. Most preferably, the zeolite catalyst material 58 is formed of a mixture of a particulate zeolite catalyst and particulate rare earth metal(s) or metal oxide(s) in a solid resin binder. Most preferably, the particulate zeolite catalyst includes micro porous aluminosilicate minerals. Especially preferred are anaicime, chabazite, clinoptilolite, heulandite, natrolite (e.g., $Na_2AL_2Si_3O_{10}*2H_2O$), phillipsite and stilbite.

The rare earth metals include at least one metal and/or metal oxide of the lanthanide series of elements of the Periodic Table. Preferred rare earth metals and metal oxides for use in the zeolite catalyst material 58 include dysprosium, holmium, lanthanum, cerium, samarium, bastnaesite, and gadolinite.

Virtually any resin binder may be employed in the practice of the present invention provided that it is inert to the fuel to be conditioned. Preferably, the resin binder is a curable epoxy binder. The particulate zeolite, rare earth metal(s) and/or metal oxide(s), optionally with catalytic metal particulates, may thus be mixed with the curable epoxy binder in fuel conditioning effective amounts. The past-like mixture may then be allowed to cure (e.g., by drying in air) into a solid which can thereafter be broken into suitably sized particles or chips. These particles or substantially flat chips of the zeolite catalyst material 58 may then be dispersed throughout the metallic elements 52 and contained within the fuel conditioning insert assembly 50. Thus, as the fuel is brought into contact with the fuel conditioning insert assembly 50, it will necessarily contact both the metallic elements 52 and the chips of the zeolite catalyst material 58 dispersed therein.

While not wishing to be bound to any particular theory, it is believed that the fuel molecules are influenced by contact with the combination of zeolites and rare earth metal(s) and/or metal oxide(s) of the zeolite catalyst material as the fuel passes through the pores of the zeolites contained within the module 10 increasing the surface area of the fuel molecules. This in turn aids in the catalytic reaction causing a change in the proportion of saturated strait-chain paraffins to unsaturated ring compound aromatics with the release of hydrogen as in a low temperature cracking process. The new mixture of saturated and unsaturated hydrocarbons are affected by slight electromagnetic force (EMF) that naturally occurs within the module 10 due to the catalytic metals contained therewithin. This slight EMF in turn causes some slight polarization of the fuel and some minor repulsion by the hydrocarbon molecules within the fuel. The repulsion along with the affect of the zeolites to increase the surface area of the fuel produces a fuel mixture which has a reduced fuel density. A reaction of the treatment of the fuel is a release of minute amounts of hydrogen which adds to the increased fuel burn efficiency.

Fuel combustion efficiency is thus increased in accordance with the present invention by combustible fossil fuel coming in contact with the zeolite catalyst region comprised of a combination of zeolites, rare earth metal(s) and/or metal oxide(s) and option other catalytic metals. The zeolite catalyst region is thus believed to cause a change in the portion of the single bonded saturated aliphatic or paraffinics in the fuel supplied to the module 10 to double bonded unsaturated ring compound aromatics with the release of hydrogen gas. As a result, a small amount of highly combustible hydrogen is released into the fuel. The newly released hydrogen plus the increased surface area of the fuel molecules as described above therefore are believed to contribute to creating a more efficient combustion with less unburned fuel being emitted as exhaust.

The zeolite catalyst material 58 may optionally include one or more particulate catalytic metals as described above. In preferred embodiments, particles of at least one catalytic metal are mixed with the particulate zeolite and particulate rare earth metal or metal oxide with a resin binder and applied onto the interior surface 22 of the housing 20 so as to form the zeolite catalyst region 58.

A layer of the zeolite catalyst material 58-1 may also be coated onto the interior surface 22 of the housing 20 near the inlet and/or outlet end caps 32, 42 so as to be positioned generally upstream and/or downstream, respectively, of the fuel conditioning insert assembly 50. The zeolite catalyst material layer 58-1 may however be a layer which is coated onto the interior surface 22 along substantially the entire extent of the housing 20 between the inlet end and outlet end caps 32, 42 thereof, respectively.

The module 10 may also include inlet and outlet screen assemblies 60, 70 which are provided in operative association with the inlet and outlets 30, 40 of the housing 20. In such a position, therefore, the fuel must necessarily pass through the screen elements 50, 60 when being introduced into and discharged from the flow passageway 24 of the housing 20, respectively.

While the screen elements forming the screen assemblies 60, 70 could be formed of a material which does not impart a catalytic effect to the fuel but instead merely filters the fuel, it is preferred that at least one and preferably both the inlet and outlet screen assemblies 60, 70 are provided so as to assist in the conditioning of the fuel. More specifically, at least one (preferably more than one) of the screen elements forming the screen assemblies 60, 70 is formed of a metal which impart a catalytic effect to the fuel as identified above. Preferably, one or each of the screen assemblies is formed of copper, aluminum, or stainless steel. In especially preferred embodiments, each of the screen assemblies 60, 70 is formed of copper. In such a manner, therefore, the screen elements forming the screen assemblies 60, 70 may functionally be a part of the conditioning insert assembly 50.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A fuel conditioning module to condition a combustible fuel prior to combustion, comprising:
    a housing having inlet and outlet ends and defining a flow-through passageway for the fuel therebetween; and
    a fuel conditioning insert assembly disposed in the flow-through passageway such that the fuel flowing in the passageway between the inlet and outlet ends of the housing contacts the fuel conditioning assembly, wherein
    the fuel conditioning insert assembly includes:
    (i) a mass of catalytic metallic elements formed of a catalytic metal,
    (ii) a mass of solid resin catalytic material in the form of chips dispersed throughout the mass of catalytic metallic elements, wherein the chips of solid resin catalytic material are comprised of a resin binder and a catalyst mixture of zeolite particulates and rare earth metal or metal oxide particulates mixed within the solid resin binder, and (iii) a wire mesh enclosure containing the mass of catalytic metallic elements and the chips of solid resin catalytic material dispersed throughout the mass of catalytic metallic elements and disposed in the flow-through passageway to create turbulence in the fuel as it flows therethrough from the inlet to the outlet of the housing.

2. The fuel conditioning module of claim 1, wherein the resin binder is an epoxy.

3. The fuel conditioning module of claim 1, wherein the zeolite particulates include a micro porous aluminosilicate mineral.

4. The fuel conditioning module of claim 1, wherein the zeolite particulates include at least one zeolite material selected from the group consisting of anaicime, chabazite, clinoptilolite, heulandite, natrolite, phillipsite and stilbite.

5. The fuel conditioning module of claim 1, wherein the rare earth metal or metal oxide particulates include at least one metal and/or metal oxide of the lanthanide series of elements of the Periodic Table.

6. The fuel conditioning module of claim 5, wherein the rare earth metal or metal oxide particulates include at least one metal and/or metal oxide selected from the group consisting of dysprosium, holmium, lanthanum, cerium, samarium, bastnaesite, and gadolinite.

7. The fuel conditioning module of claim 1, wherein the mass of metallic elements include metallic elements formed of at least one of copper, aluminum, stainless steel, titanium, magnesium, chromium, barium, calcium, platinum, palladium, nickel, bronze and iron.

8. The fuel conditioning module of claim 1, further comprising a layer of the solid resin catalytic material on an interior surface of the housing.

9. The fuel conditioning module of claim 1, wherein the fuel conditioning assembly includes inlet and outlet screen assemblies positioned at the inlet and outlet ends of the housing, respectively.

10. The fuel conditioning module of claim 9, wherein at least one of the inlet and outlet screen assemblies is formed of a catalytic metal.

11. The fuel conditioning module of claim 10, wherein the catalytic metal is at least one selected from the group consisting of copper, aluminum, stainless steel, titanium, magnesium, chromium, barium, calcium, platinum, palladium, nickel, bronze and iron.

12. A method of conditioning fuel prior to combustion comprising:
(a) introducing fuel into the inlet end of a fuel conditioning module as in claim 1;
(b) discharging conditioned fuel from the outlet end of the fuel conditioning module; and
(c) combusting the conditioned fuel.

13. The method of claim 12, wherein the fuel is a liquid fuel for an internal combustion engine, and wherein step (c) includes combusting the conditioned fuel within an internal combustion engine.

14. The method of claim 12, wherein the resin binder is an epoxy.

15. The method of claim 12, wherein the zeolite particulates include a micro porous aluminosilicate mineral.

16. The method of claim 12, wherein the zeolite particulates include at least one zeolite material selected from the group consisting of anaicime, chabazite, clinoptilolite, heulandite, natrolite, phillipsite and stilbite.

17. The method of claim 12, wherein the rare earth metal or metal oxide particulates include at least one metal and/or metal oxide of the lanthanide series of elements of the Periodic Table.

18. The method of claim 17, wherein the rare earth metal or metal oxide particulates include at least one metal and/or metal oxide selected from the group consisting of dysprosium, holmium, lanthanum, cerium, samarium, bastnaesite, and gadolinite.

19. The method of claim 12, wherein the mass of metallic elements include metallic elements formed of at least one of copper, aluminum, stainless steel, titanium, magnesium, chromium, barium, calcium, platinum, palladium, nickel, bronze and iron.

20. The method of claim 12, further comprising bringing the fuel into contact with a layer of the solid resin catalytic material upstream of the fuel conditioning insert assembly.

* * * * *